United States Patent [19]

Tuji et al.

[11] Patent Number: 4,668,291

[45] Date of Patent: May 26, 1987

[54] METHOD FOR THE PRODUCTION OF A DISPERSION OF COLORLESS CHROMOGENIC MATERIAL

[75] Inventors: Takuji Tuji; Shuki Okauchi, both of Osaka, Japan

[73] Assignee: Kanzaki Paper Manufacturing Co., Ltd., Tokyo, Japan

[21] Appl. No.: 516,387

[22] Filed: Jul. 22, 1983

Related U.S. Application Data

[63] Continuation of Ser. No. 294,511, Aug. 20, 1981, abandoned.

[51] Int. Cl.[4] .............................................. C09D 11/00

[52] U.S. Cl. ........................................ 106/21; 106/27; 106/31

[58] Field of Search ............................ 106/21, 27, 31; 282/27.5; 427/148, 150, 151, 152; 428/411

[56] References Cited

U.S. PATENT DOCUMENTS

| | | | |
|---|---|---|---|
| 4,236,732 | 12/1980 | Murakami et al. | 282/27.5 |
| 4,251,593 | 2/1981 | Sakamoto et al. | 428/411 |

*Primary Examiner*—Amelia B. Yarbrough
*Attorney, Agent, or Firm*—Morgan & Finnegan

[57] ABSTRACT

In the method for the production of a dispersion of colorless chromogenic material useful for the production of a heat-sensitive record material, a colorless chromogenic material and a heat fusible material are admixed together and heated to form a co-melt, the co-melt is dispersed in hot water having a temperature higher than the solidifying point of the co-melt to form an emulsion without causing solidification of the co-melt, and then the emulsion thus obtained is further dispersed in a water having a temperature lower than the solidification point of the co-melt to form a dispersion in which solid particles of the co-melt are dispersed.

4 Claims, No Drawings

METHOD FOR THE PRODUCTION OF A DISPERSION OF COLORLESS CHROMOGENIC MATERIAL

This is a continuation of application Ser. No. 294,511 filed on Aug. 20, 1981, now abandoned.

BACKGROUND OF THE INVENTION

This invention relates to an improved method for the production of a dispersion of colorless chromogenic material useful for the producton of a heat-sensitive record material which has an improved heat-sensitivity.

There is known a heat-sensitive record material comprising a base sheet having a color developing layer which includes finely divided particles of one of colorless chromogenic materials such as triphenylmethane compounds, fluoran compounds, auramine compounds and spiropyran compounds and finely divided particles of one of organic acceptors such as phenolic compounds, aromatic carboxylic acids and their polyvalent metal salt and/or one of inorganic acceptors such as activated clay, acid clay, attapulgite, aluminum silicate and talc. In such the heat sensitive record material like this the above mentioned two kinds of particles are, when at least one of them is melted or sublimated at an elevated temperature, brought into intimate contact with each other to develop a color. Accordingly, a relatively high temperature is required for obtaining clear and distinct color images. This is apparently disadvantageous since clear and distinct color images can never be expected at a high speed recording.

With an attempt to avoid the above mentioned disadvantages it has been proposed to disperse in the color developing layer a heat fusible material which can when melted, dissolve at least one of the colorless chromogenic material and the acceptor therein, e.g., as disclosed Japanese Patent Publication No. 4160 of 1968 and Japanese Laid-Open Patent Publication No. 19,231 of 1973. In this manner the heat sensitivity at low temperatures is improved. This improved system is useful for obtaining clear and distinct images if time for heating is relatively long as in case of the infrared copying. This system is not however utilizable for a high speed recording with such an extremely short heating time as 1 to 4 milliseconds which are required in high speed facsimiles since color can never be developed enough.

U.S. Patent Specification No. 4,236,732 or Japanese Laid-Open Patent Publication No. 48,751 of 1978 proposes to co-melt a colorless chromogenic material or an acceptor with a heat fusible material having a relatively low melting point in order to avoid the above-mentioned disadvantages inherent in the conventional systems. The heat-sensitive record material obtained by utilizing this co-melting technique is immediately heat responsive and has a good heat-sensitivity at a low temperature so that it can be used as a recording medium for high speed recording machines such as facsimiles, electronic computers and telex machines.

The above-mentioned co-melt technique, however, has a disadvantage that the production of a dispersion in which solid particles of a co-melt of a colorless chromogenic material and a heat fusible material are dispersed is not always easy. U.S. Patent Specification No. 4,236,732 or Japanese Laid-Open Patent Publication No. 48,751 of 1978 discloses two manners for obtaining solid particles of a co-melt of a colorless chromogenic material and a heat fusible material. One is to admix a colorless chromogenic material and a heat fusible material in a co-melted state, cool the mixture and then pulverize the obtained mass into finely divided particles utilizing a ball mill or any other pulverizer. The other is to admix a colorless chromogenic material and a heat fusible material in a co-melted state and then disperse and emulsify the melted mixture in warm water. These two manners for obtaining solid particles of a co-melt of a colorless chromogenic material and a heat fusible material are not always practically applicable for any kind of heat fusible material. For example, in some cases of utilizing the former technique for certain heat fusible materials, it is extremely difficult to crush the co-melt mass or the pulverizing step cannot be carried out with a good work efficiency because of aggregation of particles by an electrostatic force in the pulverizing step. On the other hand, in some cases of utilizing the latter technique for certain heat fusible materials, emulsification under the atmospheric pressure is difficult. Even if an emulsion can be formed under pressure, the fluidity of the dispersion becomes suddenly lost in the cooling step with a result of causing coagulation.

Fatty acid amides are known as the most preferred heat fusible materials because they are compatible with any colorless chromogenic materials in producing co-melts and accordingly they are superior in improving the heat response and the sensitivity at low temperatures of heat-sensitive record materials. However, each of the above-mentioned two manners is not appropriate for the production of a dispersion including solid particles of a co-melt of a colorless chromogenic material with a heat fusible material which is a fatty acid amide. It is because in utilizing the former technique it is extremely difficult to pulverize the co-melt mass since the heat fusible material has a wax like property and in utilizing the latter technique the fluidity of the dispersion becomes suddenly lost during the cooling step, probably owing to the interactions between the hydrophilic groups of the fatty acid amide and water, with a result of causing coagulation.

The primary object of the invention is to provide an improved method for the production of a dispersion including solid particles of a co-melt of at least one colorless chromogenic material and at least one heat fusible material in which the above-mentioned disadvantages involved with the conventional techniques can be avoided.

Another object of the invention is to provide an improved method for the production of a dispersion of solid particles having relatively uniform particle sizes of a co-melt of a colorless chromogenic material and a heat fusible material.

Other objects and advantages of the invention are apparent from the following detailed description:

SUMMARY OF THE INVENTION

The method for the production of a dispersion of a colorless chromogenic material according to the invention comprises the steps of admixing and heating at least one colorless chromogenic material and at least one heat fusible material to form a co-melt, dispersing said co-melt in hot water having a temperature higher than, preferably at least 5° C. higher than, the solidifying point of said co-melt to form an emulsion without causing solidification of said co-melt, and further dispersing said emulsion in a water having a temperature lower than, preferably at least 10° C. lower than, the solidifying point of said co-melt to form a dispersion in which solid particles of said co-melt are dispersed.

Preferably the heat fusible material used in the method according to the invention has a melting point within the range of 60° C. to 130° C. Also preferably the heat fusible material may be a fatty acid amide.

DETAILED DESCRIPTION OF THE INVENTION

Any of various known colorless chromogenic materials may be used for the present invention. Among them there are included, by way of examples, 3,3-bis(p-dimethylaminophenyl)-6-dimethylaminophthalide (CVL), 3,3-bis(p-dimethylaminophenyl)phthalide, 3-(p-dimethylaminophenyl)-3-(1,2-dimethylindole-3-yl)phthalide, 3-(p-dimethylaminophenyl)-3-(2-methylindole-3-yl)phthalide, 3,3-bis-(1,2-dimethylindole-3-yl)-5-dimethylaminophthalide, 3,3-bis-(1,2-dimethylindole-3-yl)-6-dimethylaminophthalide, 3,3-bis-(9-ethylcarbazole-3-yl)-5-dimethylaminophthalide, 3,3-bis-(2-phenylindole-3-yl)-5-dimethylaminophthalide, 3-p-dimethylaminophenyl-3-(1-methylpyrrole-2-yl)-6-dimethylaminophthalide, 4,4'-bis-dimethylaminobenzhydryl-benzylether, N-halophenyl-leucoauramine, N-2,4,5-trichlorophenyl-leucoauramine, rhodamine-B-anilinolactam, rhodamine-(p-nitroaniline)lactam, rhodamine-(p-chloroanilino)lactam, 3-dimethylamino-7-methoxyfluoran, 3-diethylamino-6-methoxyfluoran, 3-diethylamino-7-methoxyfluoran, 3-diethylamino-7-chlorofluoran, 3-diethylamino-6-methyl-7-chlorofluoran, 3-diethylamino-6,7-dimethylfluoran, 3-diethylamino-(7-acetylmethylamino)fluoran, 3-diethylamino-(7-methylamino)fluoran, 3,7-diethylaminofluoran, 3-diethylamino-7-(dibenzylamino)fluoran, 3-diethylamino-7-(methylbenzylamino)fluoran, 3-diethylamino-7-(o-chloroanilino)fluoran, 3-(N-cyclohexyl-(N-methylamino)-6-methyl-7-phenylaminofluran, 3-diethylamino-7-(chloroethylmethylamino)fluoran, 3-diethylamino-7-(diethylamino)fluoran, 3-(N-ethyl-N-p-toluidino)-6-methyl-7-phenylaminofluoran, 3-(N-ethyl-N-p-toluidino)-6-methyl-7-(p-toluidino)fluoran, benzoyl-leucomethyleneblue, p-nitrobenzyl-leucomethyleneblue, 3-methyl-spiro-dinaphtopyrane, 3-ethyl-spiro-dinaphthopyrane, 3,3'-dichloro-spiro-dinaphthopyrane, 3-benzylspiro-dinaphthopyrane, 3-methyl-naphtho-(3-methoxybenzo)-spiroyrane and 3-propyl-spiro-dibenzopyrane. The above colorless chromogenic materials may be used either solely or in combination.

The heat fusible material used in the present invention is capable of dissolving any colorless chromogenic material therein when heated to melt. Preferably the heat fusible material has a melting point within the range of 60° C. to 130° C. The heat fusible material should not react on any colorless chromogenic material to produce a color when brought into contact in a liquid phase with the latter. Among those heat fusible materials, there may be included the following compounds:

| | m.p. |
|---|---|
| 2,6-diisopropylnaphthalene | 68° C. |
| 1,4,5-trimethylnaphthalene | 63° C. |
| 2,3,6-trimethylnaphthalene | 102° C. |
| 1,5-dimethylnaphthalene | 82° C. |
| 1,8-dimethylnaphthalene | 65° C. |
| 2,3-dimethylnaphthalene | 105° C. |
| 2,6-dimethylnaphthalene | 113° C. |
| 2,7-dimethylnaphthalene | 98.5° C. |
| 1,2,3,4-tetramethylnaphthalene | 106° C. |

-continued

| | m.p. |
|---|---|
| 1,3,6,8-tetramethylnaphthalene | 85° C. |
| 1,2,6,7-tetramethyl-4-isopropylnaphthalene | 103° C. |
| 1,3,6,7-tetramethyl-4-isopropylnaphthalene | 97° C. |
| 2,7-di-tert-butylnaphthalene | 104° C. |
| 1,2-di-o-tolylethane | 66° C. |
| α-methyl-4,4'-di-tert-butyldiphenylmethane | 94° C. |
| 1,2-di-p-tolylethane | 82° C. |
| 1,2-bis(4-ethylphenyl)ethane | 69.8° C. |
| 2,3-di-m-tolylbutane | 97° C. |
| diphenyl-p-tolylmethane | 72° C. |
| diphenyl-o-tolylmethane | 83° C. |
| 1,2-dibenzylbenzene | 78° C. |
| 1,4-dibenzylbenzene | 86° C. |
| diphenyl-o-tolylmethane | 83° C. |
| 3,4-diphenylhexane | 92° C. |
| 1,2-bis(2,3-dimethylphenyl)ethane | 112° C. |
| 1,2-bis(2,4-dimethylphenyl)ethane | 72° C. |
| 1,2-bis(3,5-dimethylphenyl)ethane | 86° C. |
| 4'-methyl-4'-α-methyl-p-methylbenzyl-1,1-diphenylethane | 85° C. |
| bis(2,4,5-trimethylphenyl)methane | 98° C. |
| 1,2-bis(2,4,6-trimethylphenyl)ethane | 118° C. |
| (2,3,5,6-tetramethylphenyl)-(4-tert-butylphenyl)methane | 117° C. |
| 1,6-bis(2,4,6-trimethylphenyl)hexane | 74° C. |
| 1,18-diphenyloctadecane | 61° C. |
| 4,4'-dimethylbiphenyl | 121° C. |
| 2,4,6,2',4',6'-hexamethylbiphenyl | 101° C. |
| 4,4'-di-tert-butylbiphenyl | 128° C. |
| 2,6,2',6'-tetramethylbiphenyl | 67° C. |
| 1,3-terphenyl | 87° C. |
| stearic acid amide | 99° C. |
| oleic amide | 68–74° C. |
| palmitic acid amide | 95–100° C. |
| sperm oleic amide | 65–72° C. |
| coconut fatty acid amide | 85–90° C. |
| and N—methylamides, anilides, β-naphthylamides, N—(2-hydroxyethyl)-amides, N—(mercaptoethyl)amides, N—octadecylamides, phenylhydrazides. | |

Among the above compounds, fatty acid amides are preferred because fatty acid amides are compatible with colorless chromogenic materials and useful in enhancing the sensitivity in low temperatures and the heat response of the heat-sensitive record materials.

The above enumerated heat fusible materials may be used either solely or in combination at will.

The amount of the heat fusible material depends on the properties of the heat fusible material and the colorless chromogenic material used. However, generally speaking, the amount of the heat fusible material would be within the range of 0.2 to 20 parts by weight, preferably 0.5 to 8 parts by weight, per 1 part by weight of the colorless chromogenic material used.

According to the invention, at least one colorless chromogenic material and at least one heat fusible material are admixed and heated to form a co-melt. The co-melt is then dispersed in hot water to form an emulsion without causing solidification of the co-melt. Accordingly, the hot water in which the co-melt is dispersed must have a temperature at which solidification of the co-melt is prevented. Preferably the hot water is maintained at a temperature at least 5° C., most preferably at least 10° C., higher than the solidifying point of the co-melt.

The amount of the hot water in which the co-melt is dispersed is usually within the range of 50 to 1000 parts by weight, preferably 50 to 300 parts by weight, per 100 parts by weight of the co-melt. In order to carry out dispersion of the co-melt in the hot water with a good stability, suitable emulsifiers or surfactants such as polyvinyl alcohol, sodium dodecyl sulfate, sodium stearate and dodecyl alcohol may be added to the system. The amount of such additives is usually within the range of 1 to 100 parts by weight per 100 parts by weight of the co-melt. The step of dispersing the co-melt into hot water may be carried out utilizing an agitator such as a propeller mixer, homomixer or Cowles-type mixer.

According to the invention, the emulsion thus prepared is further dispersed into water having a temperature lower than the solidifying point of the co-melt to form a dispersion in which solid particles of said co-melt are dispersed. Preferably the temperature of water in which the emulsion is dispersed is maintained at least 10° C., most preferably at least 15° C., lower than the solidifying point of the co-melt.

In order to obtain a good dispersion efficiency and a good cooling efficiency, the amount of water may preferably be within the range of 50 to 1000 parts by weight, most preferably 50 to 500 parts by weight, per 100 parts by weight of the co-melt particles.

Further, in order to facilitate dispersion of the co-melt particles into water, suitable dispersing agents may be used when desired. The step of dispersing the emulsion into water may also be carried out utilizing such a suitable agitator as a propeller mixer, homomixer or Cowles-type mixer.

The size of the solid particles of the co-melt dispersed in water can be adjusted by controlling various conditions, such as those for temperature, time and agitation, for each of the steps of dispersing the co-melt into hot water to form an emulsion and dispersing the emulsion into cold water. Preferably the particle size of the solid particles of the co-melt in the end product dispersion is controlled within the range of about 1 micron to 10 microns. If required, the dispersion in which solid particles of the co-melt of a colorless chromogenic material and a heat fusible material are dispersed is subjected to a further pulverizing treatment utilizing a suitable pulverizer such as a ball mill or sand mill.

According to the invention, an abnormal rise in viscosity of the system during the cooling step for solidifying the co-melt particles can be avoided, probably for the reason that the system can pass in a short time through the thermal shock causing temperature range around the solidifying point of the co-melt. In addition, according to the invention, the co-melt is dispersed into hot water having a temperature higher than the solidifying point of the co-melt so that an emulsion including particles of the co-melt in a liquid phase can have relatively uniform particle sizes which can be maintained in the following solidifying step without causing to produce coarse particles. This is advantageous in facilitating the following pulverizing operation which may be required. Further, it is easy to obtain a dispersion of colorless chromogenic material having a required particle size distribution by controlling the temperature for carrying out each of the first and second dispersion steps. Especially, the method according to the invention is advantageous in obtaining a dispersion including solid particles of a co-melt of colorless chromogenic material and a fatty acid amide as a heat fusible material because no abnormal rise in viscosity is caused during the step of cooling and no undesirable coarse particles are produced in the end product dispersion.

The dispersion of colorless chromogenic material prepared according to the invention is especially useful as a heat-sensitive coating composition for the production of a heat-sensitive record material having an improved heat sensitivity. As to the method for the production of a heat-sensitive coating composition utilizing the dispersion of colorless chromogenic material prepared according to the invention and the method for the production of a heat-sensitive record material, there is no limitation and any conventional methods which are known can be utilized.

For example, a heat-sensitive coating composition of a single liquid type can be prepared by adding to the dispersion of colorless chromogenic material prepared according to the invention a dispersion including finely divided acceptor particles and other additives such as binders, pigments and waxes.

Various composition are known as acceptors for the heat-sensitive record material. Among them, there are included: inorganic acidic materials such as activated clay, acid clay, attapulgite, bentonite, colloidal silica and aluminum silicate; phenolic compounds such as 4-tert-butylphenol, 4-hydroxydiphenoxide, α-naphthol, β-naphthol, 4-hydroxyacetophenol, 4-tert-octylcatechol, 2,2'-dihydroxydiphenol, 2,2'-methylene-bis(4-methyl-6-tert-isobutylphenol), 4,4'-isopropylidene-bis-(2-tert-butylphenol), 4,4'-sec-butylidenediphenol, 4-phenyphenol, 4,4'-isopropylidenediphenol(bisphenol A), 2,2'-methylene-bis(4-chlorophenol), hydroquinone, 4,4'-cyclohexylidenediphenol, novolak phenol resin and other phenol polymers; aromatic carboxylic acid such as benzoic acid, p-tert-butylbenzoic acid, trichlorobenzoic acid, terephthalic acid, 3-sec-butyl-4-hydroxybenzoic acid, 3-cyclohexyl-4-hydroxybenzoic acid, 3,5-dimethyl-4-hydroxybenzoic acid, salicyclic acid, 3-isopropyl-salicylic acid, 3-tert-butylsalicylic acid, 3-benzylsalicylic acid, 3-(α-methylbenzyl)salicylic acid, 3-chloro-5-(α-methylbenzyl)salicylic acid, 3,5-di-tert-butylsalicylic acid, 3-phenyl-5-α,α-dimethylbenzylsalicylic acid, 3,5-di-α-methylbenzylsalicylic acid; and organic acidic materials such as polyvalent metal salts of the above itemized phenolic compounds or aromatic carboxylic acid. Among the polyvalent metals which can form such metallic salts like this, there are included zinc, magnesium, aluminum, calcium, titanium, manganese, tin and nickel.

Among the binders useful for preparing the heat-sensitive coating composition, there are included: polyvinyl alcohol, etherificated starch, oxidized starch, methylcellulose, hydroxyethylcellulose, a salt of styrene-acrylic acid copolymer, a salt of styrene-acrylic amide copolymer, a salt of styrene-maleic anhydride copolymer, styrene-butadiene copolymer latex.

The coating composition may also include usual pigments or oil absorptive pigments such as calcium carbonate, zinc oxide, titanium oxide, kaolin, clay, diatomaceous earth, finely divided silicon oxide, antisticking agents such as stearic acid, N-paraffin wax emulsion, various dispersing agents such as metal salts of dioctyl sulfosuccinate and fatty acids, ultraviolet ray absorbing agents such as benzophenone compounds, triazole compounds, defoaming agents such as ester compounds, ether compounds, alcohol compounds, silicone derivatives, fluorescent dyes, colored dyes and other additives.

The base sheet may be any of known types. The typical sheet materials would be papers, plastic films and synthetic papers. The amount of the coating composition for forming the heat-sensitive color developing layer is not particularly limited but usually it would be within the range of 2 to 15 g/m$^2$ on dry basis. Coating operation can be carried out utilizing any of known coating techniques such as bar coating, airknife coating and blade coating. If required, the coated product is subjected to a surface smoothening treatment utilizing a supercalender or an embossing calender to obtain the end product heat-sensitive record material.

DESCRIPTION OF THE PREFERRED EMBODIMENT

The following examples serve to illustrate the invention in more detail although the invention is not limited to the examples. Unless otherwise indicated, parts and % signify parts by weight and % by weight, respectively.

Example 1

Preparation of A liquid

The mixture of 50 parts of 3-(N-ethyl-N-p-toluidino)-6-methyl-7-phenylaminofluoran, 50 parts of 3-(N-ethyl-N-p-toluidino)-6-methyl-7-(p-toluidino)fluoran and 400 parts of stearic acid amide were heated at 165° C. to prepare a homogeneous melt.

On the other hand, 50 parts of polyvinyl alcohol was dissolved in water to prepare 600 parts of an aqueous solution. The aqueous solution was heated at 95° C. and then to the aqueous solution the above melt was added with stirring to obtain an emulsion of the melt. Further, 50 parts of dioctyl sodium sulfosuccinate was dissolved in water to prepare 600 parts of an aqueous solution. The aqueous solution was heated at 55° C. and then to the aqueous solution the above emulsion of the melt was added with stirring to disperse and simultaneously solidify the melt. Thus obtained dye dispersion was superior in fluidity and workability. The dye dispersion was passed through a sand grinder and pulverization was continued until an average particle size of 5 microns.

Preparation of B liquid 500 parts of 4,4'-isopropylidenediphenol (bisphenol A), 135 parts of 15% aqueous solution of polyvinyl alcohol and 80 parts of zinc stearate was dispersed in 1200 parts of water. The resultant dispersion was passed through a sand grinder and pulverization was continued until an average particle size of 5 microns.

Preparation of C liquid 950 parts of silicon oxide, 200 parts of 10% aqueous solution of hydroxyethylcellulose, 200 parts of 5% aqueous solution of methylcellulose, 1400 parts of 15% aqueous solution of polyvinyl alcohol, 5 parts of fluorescent dye and 5 parts of defoaming agent were dispersed in 3000 parts of water.

Preparation of a heat-sensitive record material

The above A, B and C liquids were mixed to prepare a heat-sensitive coating material. The coating material was coated on a base sheet of 49 g/m$^2$ in the weight of an amount of 10 g/m$^2$ on dry basis with an air-knife coater, dried and then super-calendered to flatten the coated surface and to prepare a heat-sensitive record material which had a high sensitivity enough to apply it to a high speed facsimile.

Control 1

50 parts of polyvinyl alcohol and 50 parts of dioctyl sodium solfosuccinate were dissolved in water to prepare 1200 parts of an aqueous solution. The aqueous solution was heated at 55° C. and to the solution the same melt as prepared in Example 1 was added with stirring to disperse and simultaneously solydify the melt. However, the fluidity of the solution grew too worse by the addition of the melt to obtain a homogeneous dye dispersion, and, it was very difficult to pulverize the obtained dye dispersion with a sand grinder.

Example 2

Preparation of A' liquid

The mixture of 70 parts of 3-(N-ethyl-N-p-toluidino)-6-methyl-7-phenylaminofluoran, 30 parts of 3-(N-cyclohexyl-N-methlamino)-6-methyl-7-phenylaminofluoran and 400 parts of palmitic acid amide was heated at 165° C. to prepare a homogeneous melt.

On the other hand, 50 parts of polyvinyl alcohol was dissolved in water to obtain 500 parts of an aqueous solution. The aqueous solution was heated at 95° C. and then to the aqueous solution the above melt was added and dispersed with stirring to prepare an emulsion of the melt.

Further, 500 parts of an aqueous solution containing 35 parts of dioctyl sodium sulfosuccinate was heated at 45° C. To the aqueous solution, the above emulsion of the melt was added with stirring to disperse and simultaneously solidify the melt. Thus obtained dye dispersion was very superior in fluidity and workability. The dye dispersion was passed through a sand grinder and pulverization was continued until an average particle size of 4 microns.

Preparation of a heat-sensitive record material

The above A' liquid was mixwd with the same B and C liquids as used in Example 1 to prepare a heat-sensitive coating material. The coating material was coated on a base sheet of 49 g/m$^2$ in the weight of an amount of 8 g/m$^2$ on dry basis with an air-knife coater. The coated material was dried and super-calendered to flatten the coated layer and to prepare a heat-sensitive record material which had a high sensitivity enough to apply it to a high speed facsimile.

Control 2

1000 parts of an aqueous solution containing 50 parts of polyvinyl alcohol and 35 parts of dioctyl sodium sulfosuccinate was heated at 45° C. To the aqueous solution the same melt as prepared in Example 2 was added with a stirring to disperse and simultaneously solidify the melt. However, the fluidity of the solution grew very worse by the addition of the melt and it was very difficult to pulverize the obtained dye dispersion with a sand grinder.

Example 3

Preparation of A" liquid

The mixture of 100 parts of 3-(N-ethyl-N-p-toluidino)-6-methyl-7-phenylaminofluoran and 300 parts of 2,6-diisopropylnaphthalene was heated at 175° C. to prepare a homogeneous melt.

550 parts of an aqueous solution containing 70 parts of polyvinyl alcohol was heated at 95° C. To the solution the above melt was added with stirring to prepare an emulsion of the melt. The emulsion was added to 700 parts of warm water at 40° C. with stirring to disperse and simultaneously solidify the melt in it. The obtained dye dispersion was superior in fluidity and workability. The dye dispersion was passed through a sand grinder and pulverization was continued until an average particle size of 4 microns.

Preparation of a heat-sensitive record material

The above A" liquid was mixed with the same B and C liquids as used in Example 1 to prepare a heat-sensitive coating material. The coating material was coated on a base sheet of 49 g/m$^2$ in the weight of an amount of 9 g/m$^2$ on dry basis with an air-knife coater. The coated material was dried and super-calendered to flatten the coated surface and to prepare a heat-sensitive record material which had a high sensitivity enough to apply it to a high speed facsimile.

Control 3

1250 parts of an aqueous solution containing 70 parts of polyvinyl alcohol was heated at 40° C. To the solution the same melt as prepared in Example 3 was added with stirring to disperse and simultaneously solidify the melt. Thus obtained dye dispersion was not uniform in the particle size and the fluidity was very bad. It was too difficult to pulverize the dye dispersion to obtain a heat-sensitive coating material.

What we claim is:

1. A method for the production of a dispersion of colorless chromogenic material useful for the production of a heat-sensitive record material comprising the steps of admixing and heating at least one colorless chromogenic material and at least one heat fusible material to form a co-melt, dispersing said co-melt in hot water having a temperature higher than the solidifying point of said co-melt to form an emulsion without causing solidification of said co-melt, and further dispersing said emulsion in water having a temperature lower than the solidifying point of said co-melt to form a dispersion in which solid particles of said co-melt are dispersed.

2. A method for the production of a dispersion of colorless chromogenic material as defined in claim 1, in which said heat fusible material has a melting point within the range of 60° C. to 130° C.

3. A method for the production of a dispersion of colorless chromogenic material as defined in claim 1, in which said heat fusible material is a fatty acid amide.

4. A method for the production of a dispersion of colorless chromogenic material useful for the production of a heat-sensitive record material comprising the steps of admixing and heating at least one colorless chromogenic material and at least one heat fusible material to form a co-melt, dispersing said co-melt in hot water having a temperature at least 5° C. higher than the solidifying point of said co-melt to form an emulsion without causing solidification of said co-melt, and further dispersing said emulsion in water having a temperature at least 10° C. lower than the solidifying point of said co-melt to form a dispersion in which solid particles of said co-melt are dispersed.

* * * * *